(12) United States Patent
Wiebe

(10) Patent No.: US 6,279,693 B1
(45) Date of Patent: Aug. 28, 2001

(54) FRICTION DAMPENER PARTICULARLY ADAPTED TO RAILWAY VEHICLE MOTION CONTROL

(75) Inventor: Donald Wiebe, Sewickley, PA (US)

(73) Assignee: Kasgro Rail Corp., New Castle, PA (US)

(*) Notice: Subject to any disclaimer, the term of this patent is extended or adjusted under 35 U.S.C. 154(b) by 0 days.

(21) Appl. No.: 09/257,445

(22) Filed: Feb. 25, 1999

Related U.S. Application Data (60) Provisional application No. 60/076,044, filed on Feb. 26, 1998.

(51) Int. Cl.$^7$ ............................. F16F 13/06; F16F 7/08; F16F 7/09
(52) U.S. Cl. .................. 188/129; 188/381; 267/196; 267/201
(58) Field of Search ..................... 188/129, 381, 188/268; 267/196, 201, 292–294, 153, 140.3, 140.5, 141, 134; 482/113, 114; 105/198.7, 198.2, 198.4; 68/23.1; 213/40 D, 31, 32 A; 248/562, 565

(56) References Cited

U.S. PATENT DOCUMENTS

| | | | |
|---|---|---|---|
| 875,759 | * | 1/1908 | Whitcomb . |
| 964,201 | * | 7/1910 | Bolton, Jr. . |
| 1,153,531 | * | 9/1915 | Adams . |
| 1,260,019 | * | 3/1918 | Oliver . |
| 1,713,914 | * | 5/1929 | O'Connor . |
| 2,010,623 | * | 8/1935 | Bugatti . |
| 2,199,145 | * | 4/1940 | Watson . |
| 2,295,551 | * | 9/1942 | Cottrell . |
| 2,639,044 | * | 5/1953 | Mulcahy . |
| 2,703,156 | * | 3/1955 | Depallens . |
| 2,705,634 | * | 4/1955 | Sampson et al. . |
| 2,752,149 | * | 6/1956 | Forcellini ............................. 188/129 |
| 3,121,218 | | 2/1964 | Hallinan ............................. 340/261 |
| 3,160,233 | * | 12/1964 | Norman et al. ..................... 188/129 |
| 3,232,597 | * | 2/1966 | Gaydecki ............................ 188/129 |
| 3,796,288 | | 3/1974 | Hollnagel ............................ 188/129 |
| 3,819,014 | * | 6/1974 | Mortensen . |
| 3,866,724 | | 2/1975 | Hollnagel ............................ 188/129 |
| 3,957,318 | | 5/1976 | Wiebe ................................ 308/138 |
| 4,080,016 | | 3/1978 | Wiebe ................................ 308/138 |
| 4,085,832 | * | 4/1978 | Gaines et al. . |

(List continued on next page.)

FOREIGN PATENT DOCUMENTS

| | | | | |
|---|---|---|---|---|
| 1039552 | * | 10/1948 | (FR) | ................................... 188/129 |
| 1167999 | * | 11/1956 | (FR) | ................................... 188/129 |
| 1510030 | * | 12/1966 | (FR) | ................................... 188/129 |

OTHER PUBLICATIONS

"Rail Transportation—1998—" RTD—vol. 15, The American Society of Mechanical Engineers, presented at The 1998 ASME International Engineering Congress and Exposition, Nov. 15–20, 1998, Cover, inside cover, pp. iii, v and 67–70.

*Primary Examiner*—Douglas C. Butler
(74) *Attorney, Agent, or Firm*—Buchanan Ingersoll, P.C.

(57) ABSTRACT

A friction dampener can include a housing having one end slidably surrounding one end of a shaft movable relative thereto. Opposing ends of the housing and shaft can each having a connecting eye member for connection to separate independently movable elements. One or more friction elements can be carried by the shaft which frictionally engage inner surfaces of the housing. The friction elements can have inner and outer portions having different material properties. The housing can be adapted to generally maintain the pressure between the friction elements and the housing within a range of desirable pressures.

7 Claims, 8 Drawing Sheets

U.S. PATENT DOCUMENTS

| | | | |
|---|---|---|---|
| 4,132,176 | 1/1979 | Wiebe | 105/197 |
| 4,165,885 * | 8/1979 | Good et al. | 188/129 |
| 4,415,146 * | 11/1983 | Sitko . | |
| 4,457,497 * | 7/1984 | Ojima | 188/129 |
| 4,706,946 * | 11/1987 | Thorn et al. . | |
| 4,765,444 * | 8/1988 | Bauer et al. | 188/129 |
| 4,915,031 | 4/1990 | Wiebe | 105/198 |
| 4,955,467 * | 9/1990 | Kallenbach | 188/381 |
| 5,080,204 | 1/1992 | Bauer et al. | 188/129 |
| 5,085,297 * | 2/1992 | Bauer et al. | 188/129 |
| 5,183,137 * | 2/1993 | Siwek et al. | 188/381 |
| 5,257,680 * | 11/1993 | Corcoran et al. | 188/129 |
| 5,535,861 * | 7/1996 | Young | 188/281 |
| 5,595,268 * | 1/1997 | Paton | 188/129 |
| 5,934,419 * | 8/1999 | Riad | 188/129 |

\* cited by examiner

FIG. 14 great
FRICTION DAMPENER PARTICULARLY ADAPTED TO RAILWAY VEHICLE MOTION CONTROL

CROSS REFERENCE TO RELATED APPLICATION

This application is based on Provisional Patent Application Serial No. 60/076,044, filed Feb. 26, 1998.

BACKGROUND OF THE INVENTION

1. Field of the Invention

The invention relates generally to energy (shock) absorbing devices, and more particularly to a friction dampener adapted to railway vehicle motion control.

2. Description of the Prior Art

Various types of shock absorption and dampening devices have been employed for many years in a variety of different applications. The most prevalent of such devices is probably the shock absorber, which is frequently used in a variety of different kinds of vehicles. The most common type of shock absorber is probably the hydraulic shock absorber, which utilizes a fluid filled cylinder and a plunger mechanism. Typically, the cylinder housing and the plunger are separately connectable to external elements which are expected to undergo relative displacements. However, there can be many applications where an energy absorber is called for, but where the hydraulic shock absorber is not necessarily desirable for many possible reasons. For example, modem hydraulic shock absorbers are relatively complex, expensive, and can be much heavier than function type dampening devices. Furthermore, because of the fluid medium utilized in hydraulic shock absorbers, the orientation of such shock absorbers can have an effect on performance. For example, hydraulic shock absorbers are generally more efficient when mounted in a relatively vertical orientation. Yet, there can be many applications where it is desirable to mount a shock absorber in a horizontal orientation. In particular, one such application is where a shock absorber, or dampener, is utilized as a yaw dampener on a railway vehicle truck assembly to control hunting.

Friction type shock absorbing devices, such as a friction dampener, can be simpler in design, less expensive, lighter weight, and unaffected by the orientation in which it is mounted. Various types of friction dampeners have been employed in the past to provide shock absorption or cushioning features where the use of hydraulic shock absorbers was undesirable. Prior friction dampeners can be one or two way energy absorbers and commonly comprise a first member, such as a cylindrical housing, a second member such as a shaft or rod, which is coaxially disposed within the housing, and a friction pad assembly carried by the shaft in sliding engagement with the inside surface of the housing. Both the housing and the shaft or rod are provided with a connecting member for attachment to external elements which are expected to undergo relative displacement. Such a friction pad assembly generally includes a friction element and some type of wedge member to initially set (or reset) the pressure between the friction element and the inside surface of the housing. Two examples of such friction dampeners are disclosed in U.S. Pat. No. 3,866, 67,724 and U.S. Pat. No. 3,796,288, both to Holnick. The friction dampener disclosed in both of the aforementioned patents provide a manual adjustment means for moving a wedge shaped member between, or out from between, the friction element in order to increase or decrease the force applied to the friction element against the inside surface of the housing.

Other friction dampeners have provided a leaf spring to bias the friction element against the housing. One such device is disclosed in U.S. Pat. No. 3,121,218 to Hallinan. Such a device can have a leaf spring that is bimetallic and manually adjustable to either urge the friction element against the housing to increase the frictional engagement, or reduce such pressure to decrease friction.

Still other friction dampeners have provided for a small servo motor to automatically adjust the wedge member to increase or decrease the pressure between the friction element and the inside surface of the housing. One such device disclosed in U.S. Pat. No. 5,080,204 to Bower et al. discloses a friction dampener for the drum of a washing machine unit. In Bower, a small servo motor is provided inside the dampener to operate a piston which moves the wedge member in order to decrease the pressure between the friction element and the inside surface of the housing. The servo motor is a thermoactuator element that is responsive to a rotational speed sensor which triggers the servo motor when a predetermined rotational speed has been exceeded.

However, such friction dampener devices can be associated with certain disadvantages resulting from the nature of the friction element when such devices are employed in some heavy load applications. An example of such an application is the use of a friction dampener on a railway vehicle truck assembly to control hunting, as referred to previously, wherein the truck assemblies can be carrying hundreds of tons of materials. During operation of a friction dampener in such an application, the extremely large forces which the dampener must control can result in very high temperatures being generated by the frictional interaction between the housing and the friction element. Because the friction element typically expands in response to an increase in temperature, this can causes a corresponding increase in the peripheral pressure on the housing. As might be expected, this increase in peripheral pressure normally results in causing the dampener to become increasingly stiffer. Compounding the situation further, the friction coefficient of the friction element is typically sensitive to temperature. Thus, as the temperature increases the friction coefficient of the friction element usually also increases. This is analogous to the situation where race car drivers spin the tires on the car to get the tire temperature up so they stick to the track better and resist slipping. A rubber/elastomeric compound experiencing this condition is commonly referred to as being "tacky." Thus, like the race car tires, the friction element can resist sliding on the inside surface of the housing as the temperature increases. The result can be that during operation of the friction dampener the pressure becomes so great and the friction element becomes so tacky that essentially no relative movement can occur between the friction element and the housing in the normal operating range. Basically the friction dampener can "lock up," at which point the dampener begins to behave like a fixed rod. This very undesirable condition can result in damage to the friction dampener or the externally connected elements which are expected to be able to move relative to each other. Furthermore, since the yaw forces are not being dampened, hunting of the truck assembly can get out of control.

Therefore, friction dampeners which do not provide some means for controlling the peripheral pressure between the friction element and the housing can be unacceptable in certain applications where the friction dampener must control heavy loads and undergo large variations in temperature and pressures. Accordingly, there is a need for a friction dampener which can generally maintain the peripheral pressure between the friction element and the housing within a preferred range of acceptable operating pressures.

SUMMARY OF THE INVENTION

In accordance with the present invention there is provided a friction dampener which can generally maintain the peripheral pressure between the friction element and the housing within a certain preferred range of acceptable operating pressures. The friction dampener can be mounted in any orientation without loss of performance, can be lighter in weight and less expensive to manufacture than a typical hydraulic shock absorber.

Such a friction dampener can include a housing having one end slidably surrounding one end of a shaft movable relative thereto. Opposing ends of the housing and shaft can each having a connecting eye member for connection to separate independently movable elements. One or more friction elements can be carried by the shaft which frictionally engage inner surfaces of the housing. The friction elements can have inner and outer portions having different material properties. The housing can be adapted to generally maintain the pressure between the friction elements and the housing within a range of desirable pressures.

In one embodiment, the friction dampener can have a generally cylindrical housing slidably surrounding a tubular shaft or rod. Friction element can be attached to the shaft for frictionally engaging an inside surface of the housing. More than one friction element may be attached to the rod and each friction element can have an annular, "donut," shape. Each friction element can also have distinct inner and outer portions which are made of different compositions and have different properties. The means for generally maintaining the peripheral pressure between each friction element and the generally cylindrical housing within a preferred range of acceptable operating pressures can be integral with the housing such that the housing is self-adjusting. This may accomplished by configuring the housing in such a manner as to permit the housing to expand in a controlled manner in response to increased peripheral pressure. Thus, the expansion of the friction elements, which can occur due to the build up of heat during operation of the device, can be compensated for by the self-adjusting housing to generally maintain the peripheral pressure within a preferred range of pressure.

In another embodiment, the friction dampener can be very similar to the friction dampener described above, except having a generally rectangular housing in which a generally rectangular shaft is slidably enclosed. Similarly to the generally cylindrical shaped dampener, the friction elements are attached to the rectangular shaft for frictionally engaging inner walls of the rectangular housing. In this embodiment, a pair of rectangular friction elements can be attached to opposite sides of the rectangular shaft for engaging opposite inner surfaces of the rectangular housing. Each rectangular friction element can also have distinct inner and outer portions which can be made of different compositions and have different properties. A different means for generally maintaining the pressure between each friction element and the housing within a preferred range of acceptable operating pressures is also provided. In this case, the means can be accomplished by forming the housing in two opposed portions, one portion can be channel shaped and the other generally flat. By sizing the channel shaped portion appropriately, shims can be used between the two opposed housing portions to provide a certain preload on the friction elements when the two housing portions are fastened together with the shaft and friction element sandwiched therebetween. The preload is calculated to take into account anticipated thermal expansion of the friction elements such that the pressure between the friction elements and the housing does not exceed an acceptable range of operating pressures. Also, the width of the channel shaped member can also be sized slightly wider than the friction elements in order to provide some space between the edges of the friction material and the side walls of the housing to accommodate some amount of thermal expansion, thus reducing the buildup of pressure between the friction elements and the housing.

Other details, objects, and advantages of the invention will become apparent from the following description and the accompanying drawings of certain presently preferred embodiments thereof.

BRIEF DESCRIPTION OF THE DRAWINGS

In the accompanying drawing figures certain preferred embodiments of the invention are illustrated in which:

FIG. 5b is an end view of FIG. 5a;

FIG. 6b is an end view of FIG. 6a;

FIG. 7b is an end view of FIG. 7a;

FIG. 8b is an end view of FIG. 8a;

DETAILED DESCRIPTION OF CERTAIN EMBODIMENTS

Figure 1:
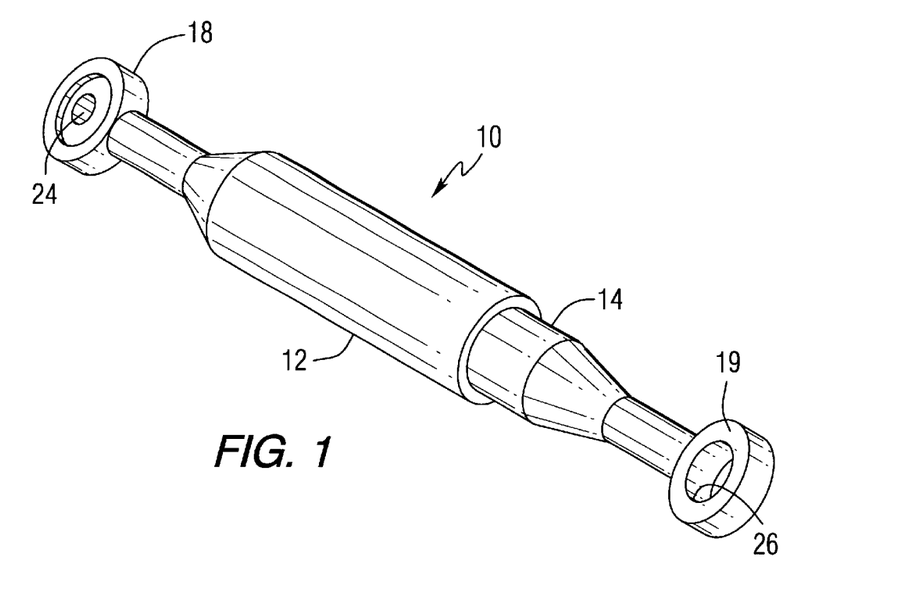
FIG. 1 is a perspective view of an embodiment of the invention.
Figure 2:
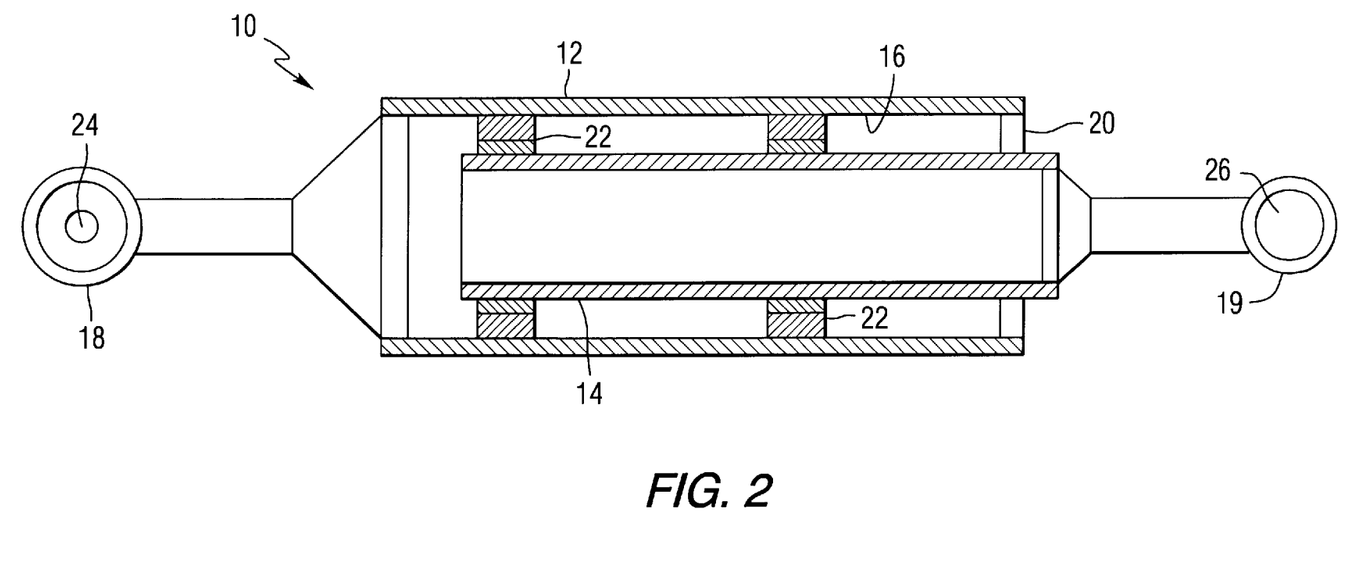
FIG. 2 is a side view cross section of FIG. 1.

Referring now to the drawing figures, and particularly FIGS. 1 and 2, there is shown a first embodiment of a generally cylindrical friction dampener 10 having a tubular housing 12 slidably surrounding a tubular shaft 14. The shaft 14, or rod, can carry one or more friction elements 22. The friction elements 22 frictionally engage an inside surface 16 of the housing 12 for controlling relative displacements between the housing 12 and the shaft 14. The housing 12 can additionally include a means for maintaining a peripheral pressure within a preferred range of operating pressures. The housing 10 preferably can have a wall 20 at an end which surrounds the shaft 14. Such a wall 20 can have an opening therein sized to permit the shaft 14 to slide therethrough. A seal 21 can also be provided between the wall 20 and the shaft 14 for keeping dirt, or water, and other foreign matter from entering inside the housing 12 and interfering with the operation of the friction elements 22 against the inside surface 16 of the housing 12. Otherwise, foreign matter could become lodged between the friction elements 22 and the housing 12 which can adversely affect the functioning of the friction dampener 10 as well as cause damage to the friction elements 22 and the inside surface 16 of the housing 12. The inside surface 16 of the housing 12 can preferably be polished and flat to provide a smooth, uniform surface for the friction elements 22 to engage.

Figure 9:
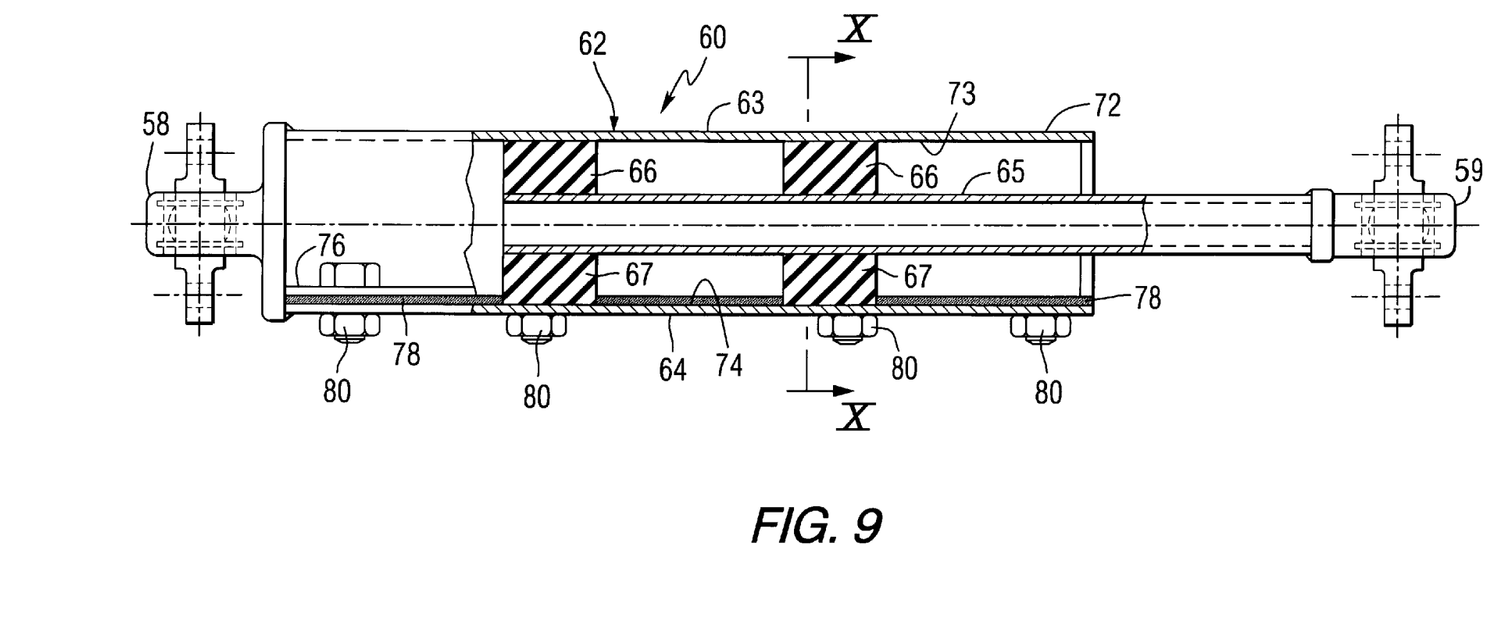
FIG. 9 is a side view cross section of an embodiment of a generally rectangular shaped friction dampener.

Connecting eye members 18 and 19 can be provided at distal ends of both the housing 12 and the shaft 14 for connecting the friction dampener 10 between two independently movable elements (an example of which is illustrated in FIG. 9) that are expected to undergo relative displacement. The connecting eye members 18 and 19 can be, for example, spherical bearings of appropriate size and strength for the particular application. The shaft 14 is preferably tubular to save weight, but could also be solid.

Figures 3, 4:
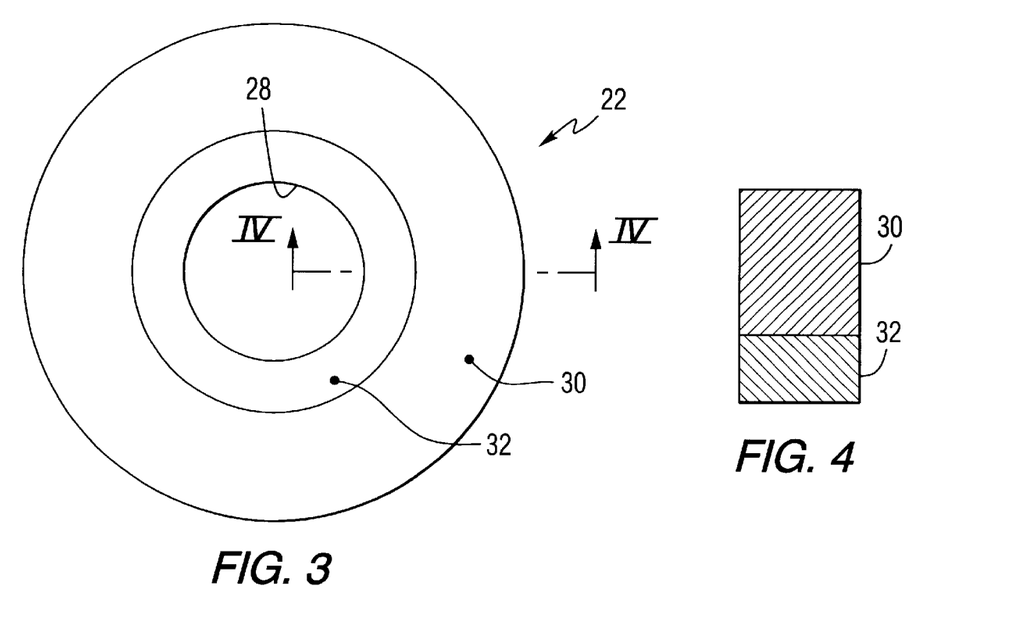
FIG. 3 is a side plan view of a friction element.
FIG. 4 is a section view of the friction element taken along the line IV—IV.

The friction elements 22 are preferably annular, or donut shaped as shown in FIG. 3, and have a central opening 28 through which each one can be inserted on, and affixed to, the shaft 14. Each friction element 22 can be bonded or otherwise rigidly attached to the shaft 14 such that essentially no displacement can occur between the shaft 14 and the friction elements 22. Each friction element 22 can be sized such that the outermost diameter thereof is greater than the diameter of the inside surface 16 of the housing 12 so that there is an initial peripheral pressure, selected according to the particular application, between the friction elements 22 and the housing 12. The outermost diameter of the friction elements 22 can be chosen according to the particular application and the desired amount of initial peripheral pressure on the housing 12.

Although two such friction elements 22 are shown in FIG. 2, more than two, or only one, can be used. Each friction element 22 can also have a longer or shorter axial extent to provide more or less shear force. For example, a shorter axial length, i.e. dimension "A" shown in FIG. 4, provides less shear force, meaning that the friction elements 22 flex less before they break lose and begin to slide on the inside surface 16 of the housing 12. Conversely, a longer axial length "A" provides a greater shear force, meaning that the friction elements 22 flex more, i.e. absorb more energy, before they break lose and begin to slide along the inside surface 16 of the housing 12. In one preferred embodiment, wherein the desired peripheral pressure is in the neighborhood of 6,000 psia, the friction elements 22 can be designed to permit about 1/16 of an inch of displacement between the shaft 14 and the housing 12 before the friction elements 22 break lose and begin to slide.

Each friction element 22 can have an inner portion 32 and an outer portion 30, as shown in FIGS. 3 and 4. The inner portion 32 can preferably be securely affixed to the shaft 14 while the outer portion 30 frictionally engages the inside surface 16 of the housing 12. The inner portion 32 and outer portion 30 can preferably consist of materials having different properties. For example, the inner portion 32 can have a particular spring coefficient of compression and the outer portion 30 can have a selected friction coefficient/wear characteristic, each chosen for the particular application. For example, the inner portion 32 can be designed (taking into account the characteristics of the outer portion 30) to provide an initial peripheral pressure of about 6,000 psia. The outer portion 30 can be of a softer or harder compound depending on the desired friction coefficient according to the particular application.

Referring now to FIGS. 5a–8b, a means for maintaining the peripheral pressure between the friction elements 22 and the housing 12 within a preferred range of pressures can be achieved by configuring the housing 12 in one of the ways illustrated. The particular configurations permit a controlled expansion of the housing 12 in response to increased peripheral pressure. The housing 12 can be formed in a several different configurations depending upon the particular application and the desired range of peripheral pressure. The particular configurations permit the housing 12 to expand in response to an increase in peripheral pressure resulting from thermal expansion of the friction elements 22. Expansion of the housing 12 can reduce the increased peripheral pressure and thereby maintain the pressure within a preferred range of pressures.

Four possible configurations, illustrated in FIGS. 5a–8a, are shown by way of example only, and it is to be understood that other configurations within the teaching of this disclosure could be provided accomplish the same result.

Figure 5A:
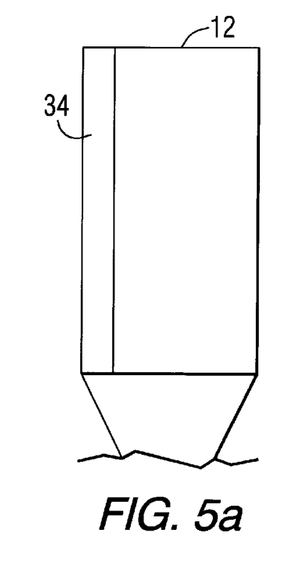
FIG. 5a is a side view partially in section of an embodiment of the invention.
Figure 5B:
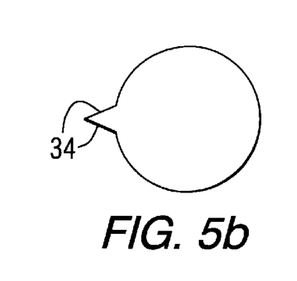

In FIGS. 5a and 5b, the housing 12 is illustrated having a cone shaped portion 34 projecting outwardly from the housing. As seen best in the cross sectional view in FIG. 5b, the cone shaped portion 34 can be integrally formed from the sidewall of the housing 12. Upon thermal expansion of the friction elements 22, shown in FIGS. 2–3, the peripheral pressure can cause the housing 12 to expand at the base of the cone shaped portion 34. The cone shaped portion 34 acts as a spring so that as the peripheral pressure increases, the base of the cone widens. Thus, the cone shaped portion 34 can flex to permit the housing 12 to expand in response to an increase in peripheral pressure. Consequently, the peripheral pressure can generally be maintained within a desired range of operating pressures.

Figure 6A:
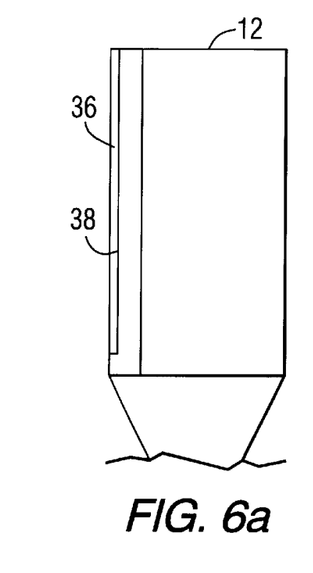
FIG. 6a is a side view partially in section of another embodiment of the invention.
Figure 6B:
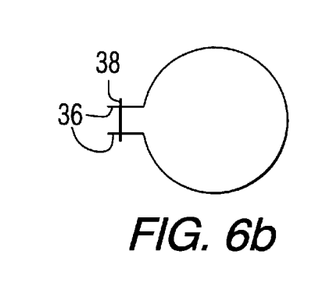

In another embodiment, the housing 12 can be configured as illustrated in FIGS. 6a and 6b, having a longitudinal split, or gap 37, along the length thereof. A pair of side portions 38 can be integrally formed from the housing 12. The side portions 36 diverge from each other and project outwardly from the housing 12. A biasing member 38 can be provided to generally maintain the divergent ends of the side portions 36 together and can help to prevent the gap 37 from overly widening, which can result in an insufficient amount of peripheral pressure between the friction elements 22 and the housing 12. As the friction elements 22 expand and increased peripheral pressure is exerted on the housing 12, the side portions can flex to permit gap 37 to widen which reduces the peripheral pressure. Consequently, the side portions 36 and gap 37 cooperated to permit the housing to expand in response to increased peripheral pressure while the biasing member 38 simultaneously prohibits over-expansion. Thus, the peripheral pressure can generally be maintained within a desired range of operating pressures.

Figure 7A:
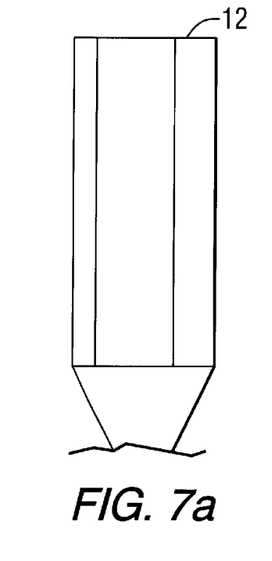
FIG. 7a is a side view partially in section of a further embodiment of the invention.
Figure 7B:
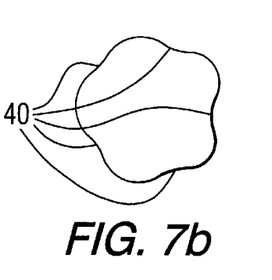

The housing 12 can also be configured as illustrated in FIGS. 7a and 7b, having a corrugated shape. In the assembled dampener 10, the friction elements 22 generally engage the low surfaces 40, shown in FIG. 7b, of the corrugations. As the friction elements 22 undergo thermal expansion, the low portions 40 can deflect outwardly and reduce the peripheral pressure in a controlled manner. Thus, the housing 12 can expand to reduce the peripheral pressure and generally maintain the pressure within a desired range of operating pressures.

Figure 8A:
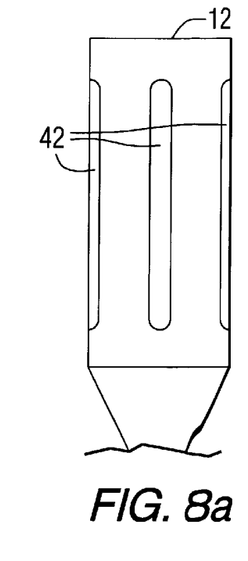
FIG. 8a is a side view partially in section of another further embodiment of the invention.
Figure 8B:
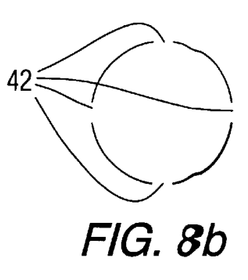

Referring now to FIGS. 8a and 8b, a further example of how the housing 12 can be configured is illustrated wherein the housing 12 is fluted. One or more flutes 42 can be provided in the housing 12 which creates a number of flexible web portions 43. As the friction elements 22 undergo thermal expansion, the web portions 43 can respond by "bowing" outwards to reduce the pressure. Consequently, the peripheral pressure can generally be maintained within a desired range of operating pressures.

Referring now to FIGS. 9–12, there are shown other embodiments of a friction dampener 60, 90 according to the invention. The friction dampeners 60, 90 shown can be similar in operation to the generally cylindrical dampener 11, except having a generally rectangular housing 62 in which is slidably enclosed a generally rectangular shaft 65. Consequently, the friction elements 66, 67 are not donut shaped, but rather are rectangular. Also, it can be preferably to employ a pair of rectangular friction elements 66, 67, attached to upper and lower sides of the rectangular shaft 65, such that only two, opposing, sides 73, 74 of the rectangular housing 62 are frictionally engaged. The upper 61 and lower 67 friction elements can be formed from the same type of material as the annular friction elements 22. Another difference is that the housing 62 can be adapted differently to maintain the pressure between the friction elements 66, 67 and the sides 73, 74 of the housing 62 within the desired range of operating pressures.

Figure 10:
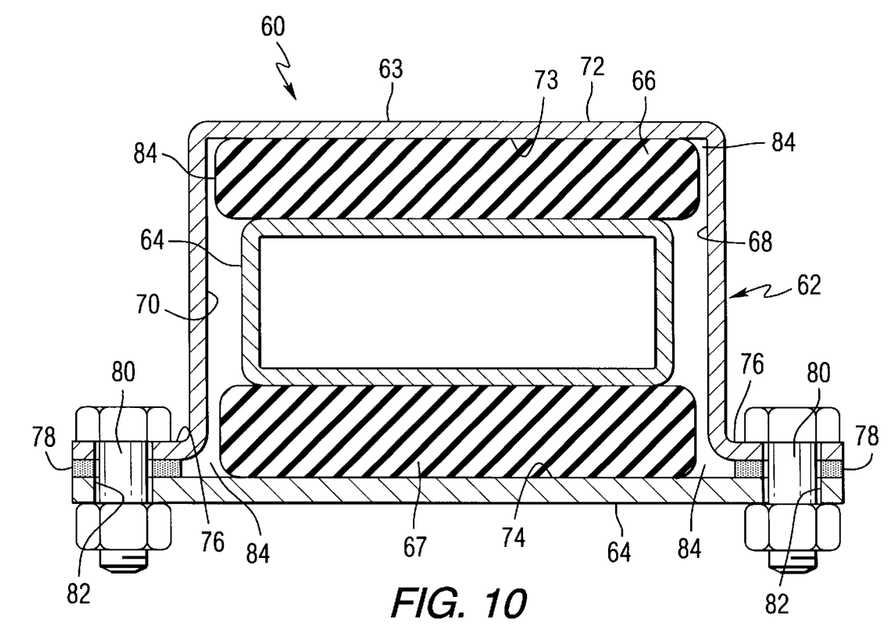
FIG. 10 is a cross section view taken along the line X—X in FIG. 9.
Figure 11:
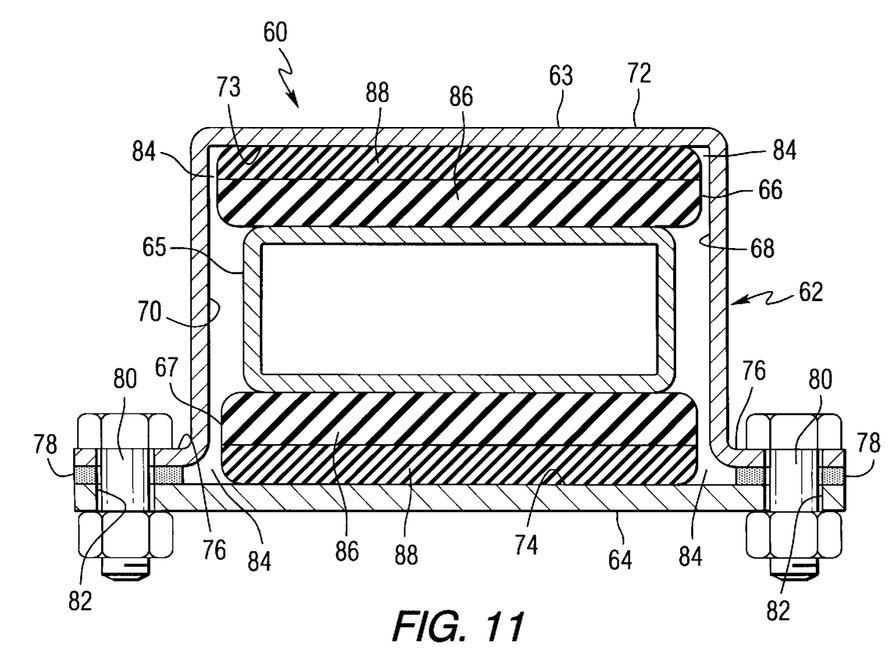
FIG. 11 is the same view as in FIG. 11 except showing a different embodiment of the friction elements.

Referring to FIGS. 9–11, the generally rectangular shaft 65 carries the generally rectangular friction elements 66, 67 which engage inner surfaces of the housing 62. Instead of a friction element which engages the entire inner periphery of the housing, like the annular friction elements 22, separate upper 66 and lower 67 rectangular friction elements, attached to upper and lower sides of the shaft 65, can be advantageously employed. Each friction element 66, 67 is attached to an opposite side of the shaft 65 and sandwiched between the shaft 65 and opposing inner friction surfaces 73, 74 of the rectangular housing 62. Just as with the generally cylindrical dampener 10, the upper 66 and lower 67 friction elements are attached to the shaft 65, such that the frictional interface is between the inner friction surfaces 73, 74 of the rectangular housing 62 and outer, interface surfaces of the upper 66 and lower 67 friction elements.

The generally rectangular housing 62 can preferably be formed from a first member 63 and a second member 64, which are connected together, enclosing the shaft 65 and friction elements 66, 67. The first member 63, as shown best in FIGS. 10 and 11, is a channel shaped member having an upper wall 72 and sidewalls 68 and 70 extending therefrom. The inner surface 73 of the upper wall 72 is frictionally engaged by the upper friction element 66. The second member 63 is a generally flat plate member. The inner surface 74 of the plate member 64 is the other friction surface of the housing 62, which is engaged by the lower friction element 67.

Figure 12:
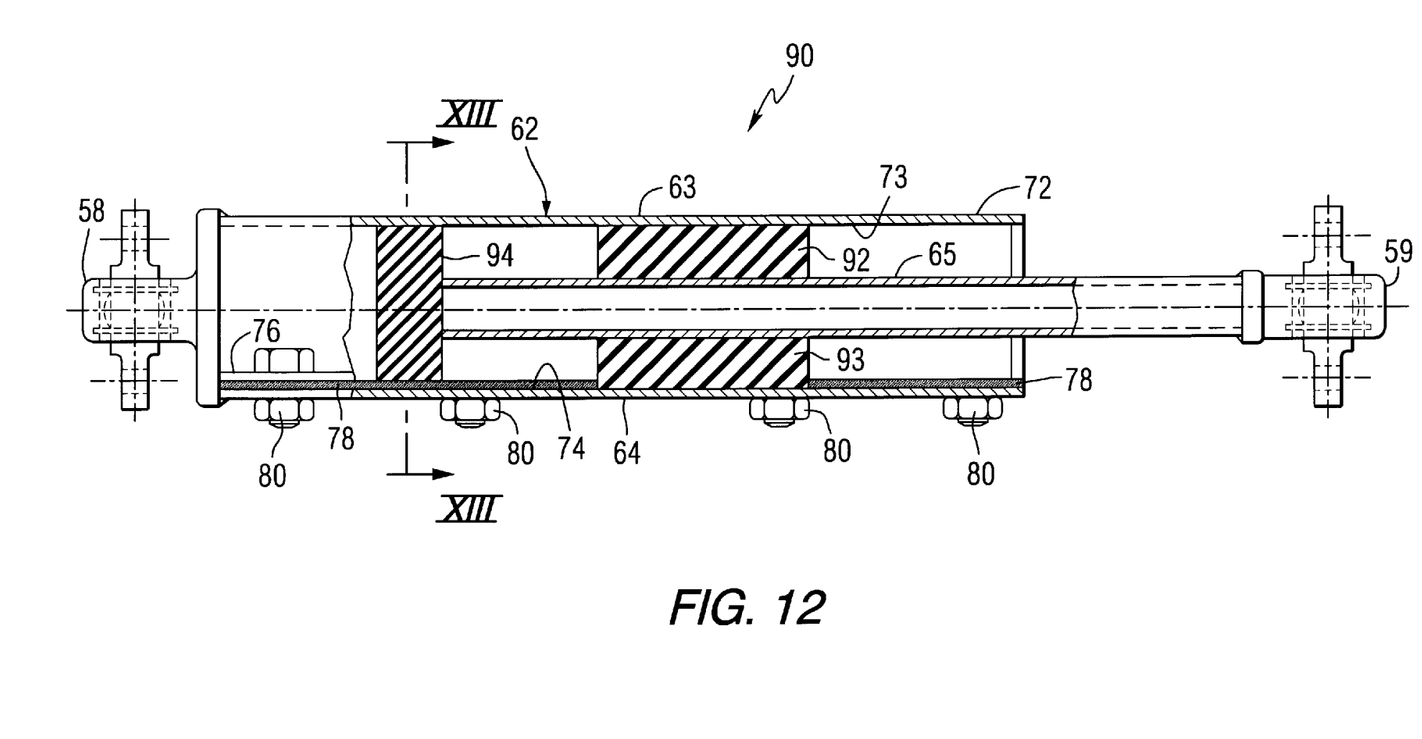
FIG. 12 is a side view cross section of another embodiment of a generally rectangular shaped friction dampener.

The sidewalls 68, 70 of the channel member 63 can be formed with flanges 76 that extend outwardly from either side wall 68, 70. These flanges 76 and can be used to connect the channel member 63 to the plate member 64. Bolts 80 can be used to fasten the channel 63 and plate 64 member together via aligned holes 82 provided through the plate member 64 and the flanges 76. Depending on the length of the rectangular housing 62, multiple bolts can be employed to connect the channel 63 and plate 64 members. For example, such as shown in FIGS. 9 and 12, four bolts are used on either side of the dampener 60, 90.

The friction elements 66, 67 can preferably be rigidly attached to opposite sides of the rectangular shaft 65 such that the sliding frictional engagement occurs between the friction surfaces 73, 74 of the rectangular housing 62 and outer interface surfaces of the upper 66 and lower 67 friction elements. When the shaft is 65 enclosed within the rectangular housing 62, the friction elements 66, 67 can preferably be somewhat compressed between the friction surfaces 73 and 74. The channel member 63 can be formed with a certain depth, selected such that when the shaft 65 carrying the friction elements 66 and 67 are disposed in the channel and the plate member 65 is bolted to the flanges 76, the friction elements 66 and 67 are compressed between the friction surfaces 73, 74 by a predetermined amount, thereby providing an initial preload. Moreover, the amount of preload force on the friction elements 66 and 67 can be adjusted using shims 78 which can be provided between the flanges 76 and the plate member 64 to more closely adjust the amount of preload. The amount of preload can be, for example, in the range of about 4,000 to 6,000 pounds. The amount of preload is also affected by the particular properties of the friction element material, as will be described more fully below.

As can be seen in the cross sectional views in FIGS. 10 and 11, the channel member 63 has a width slightly larger than the width of the friction elements 66, 67 such that there is a small amount of space indicated at 84 between the friction elements 66, 67 and the sidewalls 68 and 70 of the channel member 63. This extra space 84 provides expansion room to accommodate slight thermal expansion of the upper 66 and lower 67 friction elements. This space 84 for thermal expansion, along with the shims 78 (for providing a certain preload on the friction elements 66, 67) can be used to create and maintain operating conditions wherein the thermal expansion of the friction elements 66, 67 will not result in pressures exceeding a desired range of operating pressures.

Referring particularly to FIG. 11, each of the upper 66 and lower 67 friction elements may, similarly to the annular friction elements 22, be formed from inner 86 and outer 88 portions, each having different material properties. In particular, the inner portion 86, which is attached rectangular shaft 65, can be of a softer material having a selected coefficient of compression. In contrast, the outer portion 88, which frictionally engages the function surfaces 72, 74 of the rectangular housing 62, can be made from a harder material having a selected coefficient of friction. In this manner, and as explained in more detail in connection with the description of the annular friction elements 22, the upper 66 and lower 67 friction elements can be customized for particular applications.

Additionally, the characteristics of the inner portion 86, taking into account the characteristics of the outer portion 88, can be designed also taking into consideration the preload amount, to provide a desired initial pressure against the friction surfaces 72, 74 of the rectangular housing 62. Thus, in addition to using the shims 78, the material properties of the friction elements 66, 67 can be varied to tailor the friction dampener 60, 90 to specific applications.

Where a plurality of friction elements 66, 67 are employed, such as shown in FIG. 9, the friction elements 66, 67 can have varying axial lengths depending on the application for which the dampener 60 is being used, also as explained previously in connection with the annular shaped friction elements 22.

An embodiment of a generally rectangular friction dampener 90 is illustrated in FIG. 12 wherein a single pair of upper 92 and lower 93 friction elements are utilized. As just described, the friction elements 92, 93 can have two different portions with different material properties, and also can have different axial lengths depending on the particular application. In addition to the single pair of rectangular friction elements 92, 93, the friction dampener 90 can have a bearing member 94 attached to the distal end of the shaft 65 to provide improved stabilization to maintain the shaft 65 in an axially aligned position within the rectangular housing 62. The bearing member 94 can be made from an elastomeric material as well, but would not be a friction material, i.e. the bearing member 94 generally will have a relatively low coefficient of friction. Alternatively, the bearing member 94 could be made from metal.

Figure 13:
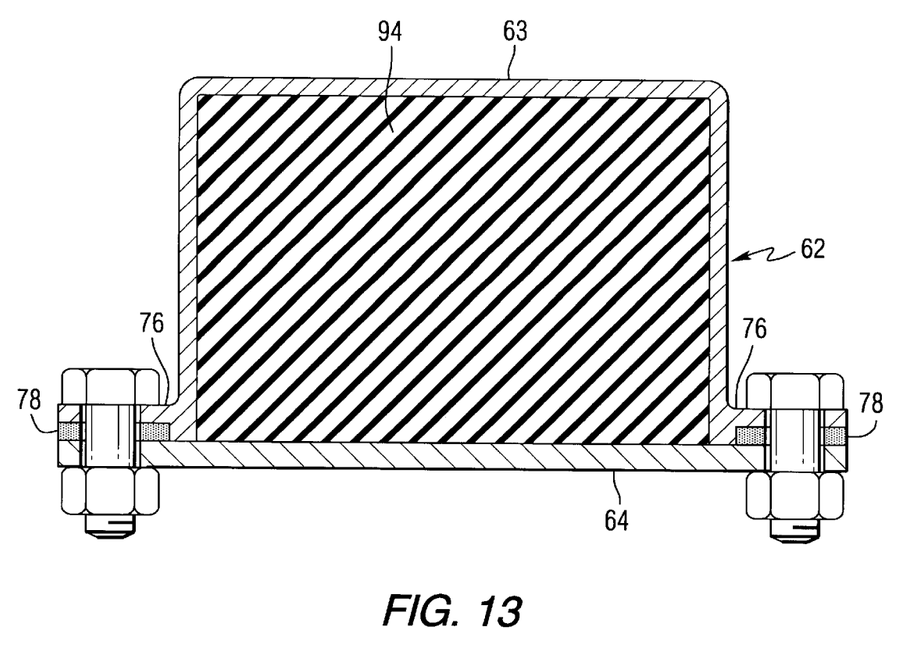
FIG. 13 is a cross sectional view taken along line XIII—XIII in FIG. 12.

A cross section view at the bearing member 94 is shown in FIG. 13. As can be seen, a preferred embodiment of the bearing 94 can be a rectangular member which preferably substantially fills the housing 62. The bearing member 94 should fit snugly, but not be under any compression in the housing 62, to ensure a tight engagement so that the shaft 65 is well stabilized in an axially aligned position in the housing 62 during operation. Since the bearing 94 material preferably has a low coefficient of friction, no appreciable amount of heat should be generated which could cause the bearing member to expand (if made from an elastomer) and exert undesirable pressure on the housing 65.

Figure 14:
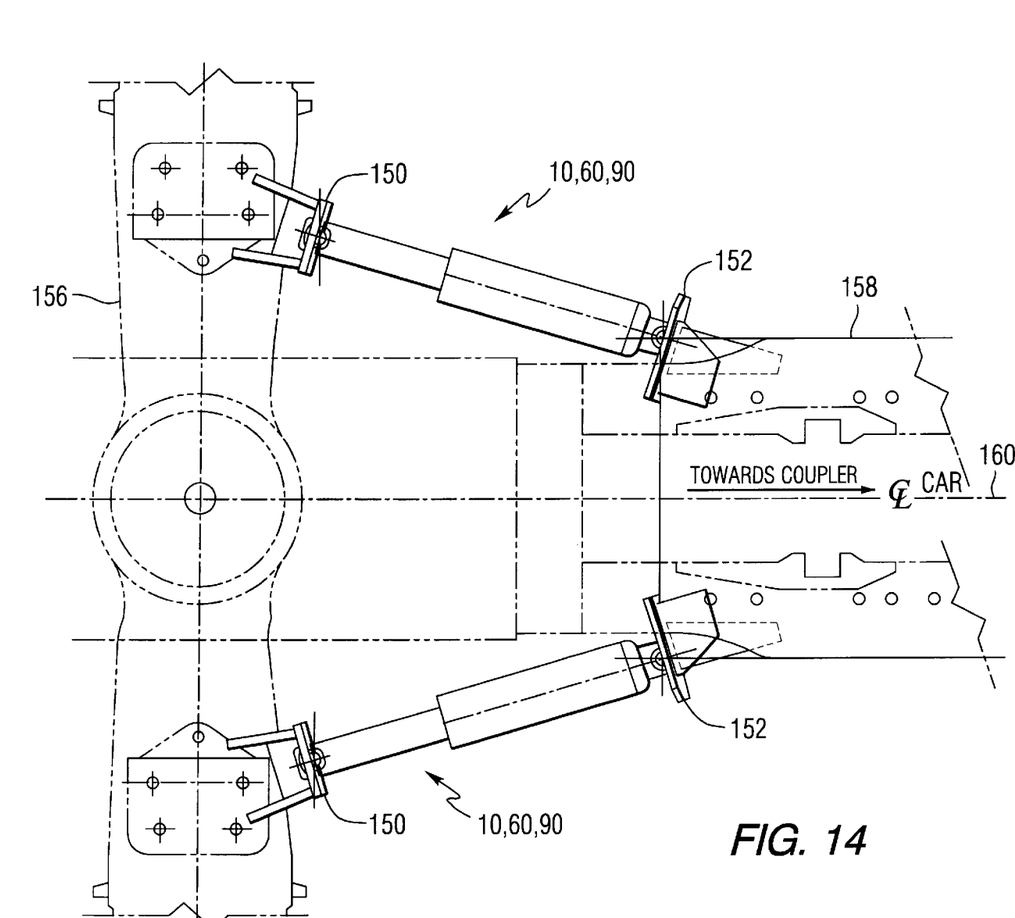
FIG. 14 is a top plan view of one possible application of the invention.

A pair of friction dampeners, which can be generally cylindrical shaped friction dampeners 10 or generally rectangular shaped friction dampeners 60, 90, are shown in FIG. 14, as used in one particular application as yaw dampeners for a railway vehicle truck assembly 155, shown in phantom lines.

In operation, one friction dampener is provided on either side of the truck assembly 155. A first end of each friction dampener is connected to a bracket 152 on the frame portion 158 of the truck assembly 155 through the connecting eye member at the distal end of the friction dampener housing. Each connecting eye member at the distal end of each shaft of the friction dampener is similarly connected to brackets 150 which are provided on the axle portion 156 of the truck assembly 155. Each connecting eye member preferably has a spherical bearing insert designed to be attached to the mounting brackets 150 and 152 provided on each of the independently movable elements 56 and 58 whose relative movements are to be regulated by the friction dampeners. The friction dampeners are mounted in a generally horizontal orientation so that substantially all of the relative movement controlled by the dampeners is normal to the longitudinal axis of the dampener. Positioning one dampener at either side of the axis about which the opposing independently moving elements 156 and 158 are expected to move provides balance to the system. This configuration also permits a softer rate of friction dampener to be employed at either side of the center line of the truck assembly 155 which can promote a smoother, more consistent absorption of the yaw forces resulting from the relative movements. Additionally, the provision of a friction dampener on either side of the truck assembly 155 can reduce stress on mounting brackets 150 and 152 since each bracket then only has to be strong enough to support half of the load compared to if only a single friction dampener is employed on only one side of the truck assembly 155.

As the truck assembly 155 moves along the track the axle portion 156 is expected to undergo movements about an axis denoted by reference numeral 160 relative to the frame portion 158 of the truck assembly 155. As the axle portion 156 undergoes these movements, the shaft of each of the friction dampeners will be moved relative to the housing. As the axle portion 156 rotates about the axis 160, the shaft of one of the friction dampeners is forced into the housing while the shaft of the opposing friction dampener is drawn out from the housing. In both the compression stroke (shaft pushed into housing) and the extension stroke (shaft drawn out from housing) the friction elements engage the friction surface(s) of the housing to dampen the movements. This type of operation is referred to as two-way operation, which means that the friction dampeners absorb energy both as the shaft is being pushed into and drawn out from the housing.

Due to the large amount of weight transported on the railway vehicle truck assemblies 155, a great deal of heat can be generated as the friction elements engage the friction surface(s) of the housing. Some of this heat is transferred into the atmosphere through the housing, but most is absorbed by the friction elements. The elastomeric material which the friction elements are formed of can be significantly affected by temperature. Typically, the elastomeric material expands and the friction coefficient changes. The expansion rate and the amount of change in the friction coefficient can vary depending on the particular compound used. This condition is best understood by analogy to the tires on a racing car. Race car drivers often spin the tires to heat up the rubber so that the tires become "tacky" and can stick to the track. Also, as the air in the tires heats up its causes the tires to expand. The tackier tires and the larger, expanded diameter both serve to help the car achieve higher speeds. The elastomeric material is similar the tires on the race car in that as they get warmer they both expand and more strongly adhere to the friction surface(s) in the housing. The result is that as the temperature increases the engagement between the friction elements and the friction surface(s) in the housing can increase to the point where a great deal more force is required to cause the friction elements to slide within the housing. Although desirable for the race car driver, this condition can be disastrous in the case of a friction dampener. Unlike the tires and the track, it is generally desirable that the friction dampener maintain a relatively constant friction coefficient between the friction elements and the friction surface(s) in the housing. To accomplish this it can be very important to maintain the pressure between the friction elements and the friction surface(s) in the housing within a preferred range of operating pressures.

If no means for maintaining the peripheral pressure within a certain range of acceptable operating pressures is provided, the increased pressure and higher friction coefficient can cause the friction dampener to reach a point where virtually no relative displacement between the shaft and the housing can occur. In effect, the friction dampener can begin to behave like a fixed rod. This is a very undesirable condition which can cause damage to the dampener and result in an unsafe condition in the railway vehicle truck assembly 155. The inability to dampen the yaw forces of the truck assembly 155 can result in an uncontrolled hunting condition which, in a worst case, can result in derailment. Consequently, the friction dampeners, both of the cylindrical and rectangular embodiment, each employ some manner, as described in detail above, of maintaining the pressure between the friction elements and the friction surface(s) within a desired operating range, as described above.

Particularly in regard to the elastomeric material from which the friction elements are formed, the preferred composition can vary depending on the particular application and the corresponding material properties desired. Suitable elastomeric materials can be purchased from C U E., having a place of business in Butler County, Pa. With respect to certain desirable properties of the elastomeric material, some examples, and a discussion of such elastomers used in the context of railcar truck assemblies is provided in my U.S.

patent Ser. Nos. 3,957,318 and 4,080,016, both of which are hereby incorporated herein by reference.

Although certain embodiments of the invention have been described in detail, it will be appreciated by those skilled in the art that various modification to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A friction dampener for interposition between separate independently movable elements which are expected to undergo relative displacements, said friction dampener comprising:
   a. a housing having a first connecting member for connection to a first independently movable element;
   b. a shaft having a first end slidably disposed in said housing and an opposite end having a second connecting member for connection to a second independently movable element;
   c. at least one friction element carried by said shaft in contact with and frictionally engaging said housing;
   d. said housing configured to compensate for thermal expansion and generally maintain pressure between said at least one friction element and said housing within a range of desired pressures;
   e. said housing having a generally rectangular shape defined by a pair of opposed friction surfaces and a pair of opposed side walls;
   f. said at least one friction element having at least one interface surface engaging at least one of said pair of opposed friction surfaces of said housing, said interface surface having a width less than the space between said pair of opposed side walls;
   g. said housing at least partially accommodating thermal expansion of said at least one friction element between said opposed side walls such that pressure between said at least one friction element and said housing resulting from anticipated thermal expansion of said at least one friction element is generally maintained within said range of desired pressures;
   h. said shaft having a generally rectangular shape;
   i. said generally rectangular housing having a channel member connected to a plate member, said channel member having an upper friction surface and a pair of side walls extending therefrom, said pair of side walls connected to said plate member, said plate member defining a lower friction surface opposite said upper friction surface;
   j. said at least one friction element is at least two friction elements each having at least one interface surface frictionally engaging respective ones of said upper and lower friction surfaces;
   k. said at least two friction elements being initially compressed between said upper and lower friction surfaces by a predetermined amount when disposed within said rectangular housing along with said shaft; and
   l. selectively adjusting the spacing between said upper friction surface and said lower friction surface to provide said predetermined amount of initial compression of said at least two friction elements within said housing such that pressure between said at least two friction elements and said upper and lower friction surfaces resulting from anticipated thermal expansion of said at least two friction elements is maintained within said desirable range of pressures.

2. The friction dampener of claim 1 wherein said selectively adjusting comprises inserting at least one shim between said channel member and said plate member.

3. A friction dampener for interposition between separate independently movable elements which are expected to undergo relative displacements, said friction dampener comprising:
   a. a housing having a first connecting member for connection to a first independently movable element;
   b. a shaft having a first end slidably disposed in said housing and an opposite end having a second connecting member for connection to a second independently movable element;
   c. at least one friction element carried by said shaft in contact with and frictionally engaging said housing;
   d. said housing configured to compensate for thermal expansion and generally maintain pressure between said at least one friction element and said housing within a range of desired pressures;
   e. said housing and said shaft having a generally rectangular shape;
   f. said generally rectangular housing having a channel member connected to a plate member, said channel member having an upper friction surface and a pair of side walls extending therefrom, said pair of side walls connected to said plate member, said plate member defining a lower friction surface opposite said upper friction surface;
   g. said at least one friction element is at least two friction elements each having at least one interface surface frictionally engaging respective ones of said upper and lower friction surfaces;
   h. said at least two friction elements being initially compressed between said upper and lower friction surfaces by a predetermined amount when disposed within said rectangular housing along with said shaft; and
   i. selectively adjusting the spacing between said upper friction surface and s aid lower friction surface to provide said predetermined amount of initial compression of said at least two friction elements within said housing such that pressure between said at least two friction elements and said upper and lower friction surface s resulting from anticipated thermal expansion of said at least two friction elements is maintained within said desirable range of pressures.

4. The friction dampener of claim 3 wherein said selectively adjusting comprises inserting at least one shim between said channel member and said plate member.

5. The friction dampener of claim 3 further comprising said at least one friction element having a certain coefficient of compression, said certain coefficient of compression chosen to further selectively adjust said predetermined amount of initial compression.

6. The friction dampener of claim 3 further comprising said at least two friction elements being at least four friction elements, one pair of said at least two friction elements attached at one location on said shaft and a second pair of said at least four friction elements attached to said shaft at a spaced apart location from said first pair.

7. The friction dampener of claim 3 further comprising said channel member having flanges standing from each of said pair of sidewalls, said flanges connected to said plate member and said selectively adjusting comprises inserting at least one shim between said flange members and said plate member.

* * * * *